(12) United States Patent
Gsänger et al.

(10) Patent No.: US 12,438,776 B2
(45) Date of Patent: Oct. 7, 2025

(54) METHOD AND CONTROL PROGRAM FOR AUTOMATED CONFIGURATION OF A COMMUNICATION NETWORK COMPRISING MULTIPLE VIRTUAL LOCAL AREA NETWORKS

(71) Applicant: Siemens Aktiengesellschaft, Munich (DE)

(72) Inventors: Volker Gsänger, Kammerstein (DE); Wolfgang Schwering, Röttenbach (DE); Torsten Keidel, Erlangen (DE); Andreas Rehm, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 116 days.

(21) Appl. No.: 18/368,657

(22) Filed: Sep. 15, 2023

(65) Prior Publication Data

US 2024/0097981 A1 Mar. 21, 2024

(30) Foreign Application Priority Data

Sep. 16, 2022 (EP) .................................. 22196186

(51) Int. Cl.
*G06F 15/177* (2006.01)
*H04L 12/46* (2006.01)
(Continued)

(52) U.S. Cl.
CPC ...... *H04L 41/0886* (2013.01); *H04L 12/4641* (2013.01); *H04L 41/0893* (2013.01)

(58) Field of Classification Search
CPC ............. H04L 12/1886; H04L 12/4641; H04L 41/0893; H04L 41/0806; H04L 41/0886; H04L 41/12; H04L 41/5054
See application file for complete search history.

(56) References Cited

U.S. PATENT DOCUMENTS

| | | | |
|---|---|---|---|
| 6,680,945 B1 * | 1/2004 | Merchant | H04L 12/4645 370/395.53 |
| 7,702,732 B1 * | 4/2010 | Squire | G06F 15/177 709/219 |

(Continued)

FOREIGN PATENT DOCUMENTS

| | | |
|---|---|---|
| EP | 3142296 | 3/2017 |
| EP | 3646559 | 5/2020 |
| WO | 2020224753 | 11/2020 |

OTHER PUBLICATIONS

Anonymous: "IEEE Standard for Local and Metropolitan Area Networks—Bridges and Bridged Networks—Amendment 31: Stream Reservation Protocol (SRP) Enhancements and Performance Improvements", IEEE Standard, IEEE, Piscataway, NJ USA, 29, pp. 1-208, Oct. 2018 (Oct. 29, 2018).

*Primary Examiner* — Dustin Nguyen
*Assistant Examiner* — Hao H Nguyen
(74) *Attorney, Agent, or Firm* — Cozen O'Connor

(57) ABSTRACT

Method and control program for automatically configuring a communication network with a plurality of Virtual Local Area Networks (VLANs), wherein for each VLAN, starting from communication terminals on ports of switches and/or routers along paths assigned to the respective VLAN, a VLAN port operating mode is defined in each case, VLAN segment boundaries are defined via first VLAN port configuration tags, where second VLAN port configuration tags are used to set limits for tracing the paths assigned to the respective VLAN to define the VLAN port operating modes, third VLAN port configuration tags are used to set limits for tracing the paths assigned to the respective VLAN only with respect to outbound frames to define the VLAN port operating modes, and where the tracing of the paths assigned to the respective VLAN, and a configuration of the ports (Continued)

comprised by these paths are controlled using the VLAN port configuration tags.

16 Claims, 7 Drawing Sheets

(51) Int. Cl.
*H04L 41/08* (2022.01)
*H04L 41/0893* (2022.01)

(56) References Cited

U.S. PATENT DOCUMENTS

| | | | |
|---|---|---|---|
| 7,706,363 B1* | 4/2010 | Daniel | H04L 12/4645 370/395.3 |
| 8,918,631 B1* | 12/2014 | Kumar | H04L 63/00 370/254 |
| 9,282,061 B1* | 3/2016 | Zoucha | H04L 49/30 |
| 10,205,638 B1* | 2/2019 | Angrish | H04L 41/40 |
| 10,313,201 B2 | 6/2019 | Albrecht et al. | |
| 11,171,810 B1* | 11/2021 | Murray | H04L 12/4645 |
| 2003/0145118 A1* | 7/2003 | Volpano | H04L 9/3273 709/249 |
| 2005/0138171 A1* | 6/2005 | Slaight | H04L 12/4641 709/225 |
| 2006/0209714 A1* | 9/2006 | Ackermann-Markes | H04L 12/4645 370/254 |
| 2007/0116014 A1* | 5/2007 | Shuen | H04L 12/4645 370/389 |
| 2008/0056161 A1* | 3/2008 | Okita | H04L 41/00 370/254 |
| 2009/0304007 A1* | 12/2009 | Tanaka | H04L 45/26 370/395.53 |
| 2009/0323687 A1* | 12/2009 | Nishimura | H04L 45/24 370/389 |
| 2011/0299413 A1* | 12/2011 | Chatwani | H04L 49/65 370/254 |
| 2012/0016973 A1* | 1/2012 | Haris | H04L 49/00 709/220 |
| 2012/0287936 A1* | 11/2012 | Biswas | H04L 12/4641 370/395.3 |
| 2012/0297037 A1* | 11/2012 | Kumagai | H04L 61/5061 709/222 |
| 2013/0148511 A1* | 6/2013 | Banga | H04L 41/12 370/250 |
| 2014/0359114 A1* | 12/2014 | Takamure | G06F 9/45558 709/224 |
| 2015/0103828 A1* | 4/2015 | Chandhoke | H04L 12/4645 370/392 |
| 2015/0103832 A1* | 4/2015 | Chandhoke | H04L 49/206 370/392 |
| 2015/0103836 A1* | 4/2015 | Chandhoke | H04L 49/9057 370/401 |
| 2016/0182293 A1* | 6/2016 | Di Benedetto | H04L 69/329 709/221 |
| 2016/0301577 A1* | 10/2016 | Lane | H04L 41/18 |
| 2018/0026872 A1* | 1/2018 | Manthiramoorthy | H04L 45/28 370/249 |
| 2018/0074841 A1* | 3/2018 | Ravenhill | H04L 12/4641 |
| 2020/0162314 A1* | 5/2020 | Kawada | H04L 12/4625 |
| 2020/0220846 A1 | 7/2020 | Schwering | |
| 2022/0083348 A1* | 3/2022 | Chaganti | H04L 41/0806 |
| 2022/0417335 A1 | 12/2022 | Fischer et al. | |
| 2023/0179444 A1* | 6/2023 | Zhai | H04L 41/0846 370/254 |
| 2023/0403486 A1* | 12/2023 | He | H04Q 11/0067 |
| 2024/0098618 A1* | 3/2024 | Lawton | H04L 45/24 |

* cited by examiner

METHOD AND CONTROL PROGRAM FOR AUTOMATED CONFIGURATION OF A COMMUNICATION NETWORK COMPRISING MULTIPLE VIRTUAL LOCAL AREA NETWORKS

BACKGROUND OF THE INVENTION

1. Field of the Invention

The invention relates to a control program and method for the automated configuration of a communication network comprising a plurality of VLANs, in particular a communication network of an industrial automation system.

2. Description of the Related Art

An industrial automation system usually comprises a large number of automation devices networked together via an industrial communication network and is used as part of a production or process automation system for controlling or regulating plants, machines or devices. Time-critical constraints in industrial automation systems mean that predominantly real-time communication protocols, such as PROFINET, PROFIBUS, real-time Ethernet or time-sensitive networking (TSN), are used for communication between automation devices.

Disruptions in communication connections between computer units of an industrial automation system or automation devices may result in undesirable or unnecessary repetition of the transmission of a service request. In addition, messages that are compromised or have not been completely transmitted may prevent an industrial automation system from transferring to or remaining in a safe operating state, for example. The above problems are exacerbated by a message traffic typical of industrial automation systems with relatively many but relatively short messages.

EP 3 142 296 B1 disclosed a method for configuring a modular control device of an industrial automation system, which comprises a central processing unit and at least one communication module, each with an integrated router. Router configuration units of first routers detect available router functions and assigned priority values of other routers. First routers have an extended router function for connecting to a higher-level communication network. Second routers include a restricted router function for connecting to a subordinate field-level subnet. If other first routers are present, then the router configuration units of the first routers each use the priority values to check the first router to which the highest priority value is assigned. The first router with the highest priority value is configured as a higher-level router for connecting to a higher-level communications network.

To check datagrams transmitted within an industrial automation system having multiple automation cells, datagrams to be checked from the automation cells are transmitted via a respective firewall interface to a firewall system for checking in accordance with EP 3 646 559 B1 where they are checked using a rule-based procedure. The firewall system is formed by at least one virtual machine provided within a data processing system comprising multiple computing units. A data link layer tunnel is set up between the respective firewall interface and the firewall system to transmit the datagrams to be checked. Both datagrams to be checked and at least successfully checked datagrams are transmitted within the respective data link layer tunnel.

WO 2020/224753 A1 discloses a method for configuring an industrial real-time capable communication network for the cyclic transmission of messages, each comprising one or more data sets. The communication network comprises a message source for generating and cyclically sending the messages, at least one message sink for receiving and processing the messages, and at least one network component, which forwards messages from the message source to the message sinks. The configuration involves determining a network topology of the communication network for the transmission of a data stream to be sent from the message source in the future, in which the messages are each sent cyclically with all data sets.

According to WO 2020/224753 A1, it is determined which one or more of the data sets in the data stream each of the message sinks wishes to receive. In addition, a specific filter for each network component is determined and configured, by determining from the network topology the components connected to the respective network component and the data sets required for the connected message sinks. As a result, only essential data sets are transmitted in the messages in the downstream direction of the data stream during operation of the communication network.

In industrial automation systems, communication networks are often segmented based on Virtual Local Area Networks (VLANs) in accordance with Institute of Electrical and Electronics Engineers (IEEE) standard 802.1Q. A VLAN configuration depends on individual application requirements within an industrial automation system and is usually performed individually for each subnet. For a VLAN configuration, on network infrastructure devices such as switches and routers, it is necessary to specify in particular trunk ports, via which data traffic assigned to multiple different VLANs is transmitted, and access ports, to which usually terminals only assigned to one VLAN are connected. In addition, unicast data traffic, for example according to PROFINET-IO, on the one hand, and multicast data traffic, for example according to International Electrotechnical Commission (IEC) standard 61850-8-2 GOOSE, on the other hand, must be handled differently in many applications. Thus, a VLAN configuration covering all network infrastructure devices within an industrial automation system can quickly become unmanageable and error-prone. In addition, changes to existing VLAN configurations must be made individually on a per-device and per-port basis.

SUMMARY OF THE INVENTION

In view of the foregoing, it is therefore an object of the present invention is to provide a method for automated configuration of a communication network comprising a plurality of VLANs, which enables an efficient and less error-prone configuration of VLANs in complex structured communication networks, and to create a suitable implementation for carrying out the method.

This and other objects and advantages are achieved in accordance with the invention by a control program and method for automated configuration of a communication network comprising multiple VLANs in which, for each VLAN, starting from communication terminals on ports of switches and/or routers along paths assigned to the respective VLAN, a VLAN port operating mode is defined in each case depending on the usage of a respective port by a respective VLAN. Paths assigned to a VLAN comprise, in particular, selected paths that are used to transmit frames assigned to the respective VLAN. Preferably, the tracing of the paths assigned to the respective VLAN to define the VLAN port operating modes is performed starting from each communication terminal assigned to the respective VLAN.

In accordance with the invention, VLAN segment boundaries are defined via first VLAN port configuration tags. Inbound and outbound frames on the respective port are assigned to the same VLAN. Using second VLAN port configuration tags, limits are set for tracing the paths assigned to the respective VLAN to define the VLAN port operating modes. Using third VLAN port configuration tags, limits for tracing the paths assigned to the respective VLAN are set only with respect to outbound frames to define the VLAN port operating modes. The tracing of the paths assigned to the respective VLAN, and a configuration of the ports comprised by these paths, which is based on the definition of the VLAN port operating modes, are controlled using the VLAN port configuration tags.

By using VLAN port configuration tags, the present invention provides a basis for automating VLAN configurations. This means that network and/or plant operators no longer need to manually manage the respective VLAN configuration for each individual device. Rather, appropriate configuration tasks are advantageously completed automatically after setting the VLAN port configuration tags. Setting the VLAN port configuration tags thus enables a simplified, fail-safe engineering of communication networks, particularly in industrial automation systems. This applies to an initial VLAN configuration as well as to subsequent changes or enhancements.

For a VLAN with no assigned communication terminals, the tracing of the paths assigned to the respective VLAN to define the VLAN port operating modes is advantageously carried out starting from at least one selected switch or router assigned to the respective VLAN. In this case, to trace the paths assigned to the respective VLAN, for example, a switch or router can be selected at the lowest topological layer of the communication network within the respective VLAN segment boundary.

In accordance with a preferred embodiment of the present invention, the VLAN port operating modes each comprise at least one trunk mode and one untagged mode. Frames (data frames) that include a VLAN identifier assigned to the respective VLAN are routed via a port if the port is configured in trunk mode for that VLAN. On the other hand, inbound frames that do not include a VLAN identifier are routed via a port after inserting a VLAN identifier if the port is configured in untagged mode for that VLAN with respect to inbound frames. In addition, outbound frames that include a VLAN identifier assigned to the respective VLAN are routed via a port after removing the VLAN identifier if the port is configured in untagged mode for that VLAN with respect to outbound frames.

Advantageously, a VLAN that comprises communication terminals without VLAN functionality and at the VLAN segment boundary of which the frames assigned to the VLAN are forwarded via a port on which a first VLAN port configuration tag is set, is configured in untagged mode for inbound and outbound frames on the respective port. This ensures a consistent, convenient conversion of the VLAN port configuration tags into the VLAN configuration. Preferably, only one VLAN is configured in untagged mode for inbound and outbound frames on the respective port on which a first VLAN port configuration tag is set. Furthermore, each VLAN, the assigned frames of which are forwarded via a port on which a second VLAN port configuration tag is set, is configured in trunk mode for outbound frames on the respective port, in accordance with a further preferred embodiment.

In addition, the VLAN port operating modes can each additionally include a forbidden mode. Here, forwarding of inbound or outbound frames that include a VLAN identifier assigned to that VLAN via a port is permanently blocked in a non-dynamically modifiable manner if the port is configured in forbidden mode for that VLAN with respect to inbound or outbound frames. Each VLAN that has no assigned inbound frames on a port, on which a third VLAN port configuration tag is set, is advantageously configured in forbidden mode for outbound frames on the respective port. This enables even more convenient engineering of communication networks. Here, each VLAN that has assigned inbound frames on a port, on which a third VLAN port configuration tag is set, is configured in trunk mode for outbound frames on the respective port.

In addition to the VLAN port configuration tags, VLAN multicast configuration tags can be set for simple and reliable handling of unicast and multicast data traffic in the engineering of communications networks. With first VLAN multicast configuration tags, VLAN segment boundaries are advantageously defined for transmission of multicast frames within a multicast domain comprising multiple VLANs. In addition, second VLAN multicast configuration tags can be used to define communication devices forwarding multicast frames within the multicast domain. By contrast, third VLAN multicast configuration tags can be used to define communication terminals sending or receiving multicast frames within the respective multicast domain. Using the VLAN multicast configuration tags, the VLAN port operating mode of the ports of the communication devices forwarding multicast frames that are assigned to the respective multicast domain is preferably defined for each multicast domain. Thus, individual application requirements regarding the desired handling of unicast data traffic or multicast data traffic can be taken into account in a user-friendly and fail-safe manner when configuring the VLAN.

For the multicast domain defined according to the first VLAN multicast configuration tags, at least one separate multicast VLAN is advantageously configured. In addition, ports between communication devices forwarding multicast frames assigned to the same multicast domain and defined in accordance with the second VLAN multicast configuration tags are configured in trunk mode for the respective multicast VLAN. Ports on communication devices forwarding multicast frames, to which communication terminals assigned to the same multicast domain and defined in accordance with the third VLAN multicast configuration tags are connected, are also configured in trunk mode for the respective multicast VLAN.

In the event that the VLAN port operating modes each comprise a forbidden mode, ports on communication devices forwarding multicast frames, to which no communication terminals are connected that are defined by third VLAN multicast configuration tags and/or are assigned to a multicast domain, are configured in the forbidden mode for the respective multicast VLAN. Again, this can ensure that the VLAN configuration is not inadvertently altered by automatic VLAN learning on the respective ports.

In accordance with a further advantageous embodiment of the present invention, for forwarding multicast frames between communication terminals in two different VLANs, a multicast VLAN coupling the two VLANs to each other is configured, which comprises forwarding communication devices in both VLANs, communication terminals in both VLANs, and comprises forwarding communication devices along at least one path between the two VLANs. Accordingly, the multicast VLAN coupling the two VLANs is configured in trunk mode on the respective port of the communication devices forwarding the multicast frames for outbound multicast frames. This allows simple and secure configuration of multicast VLANs that comprise multiple existing VLANs.

The control program in accordance with the invention performs the method in accordance with the disclosed embodiments and is loadable in a working memory of a computer or a virtual machine. Here, the control program has at least one code section, the execution of which causes the method in accordance with the disclosed embodiments to be executed when the control program runs in the computer or in the virtual machine.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in greater detail below on the basis of an exemplary embodiment with reference to the drawing, in which.

DETAILED DESCRIPTION OF THE EXEMPLARY EMBODIMENTS

Figure 1:
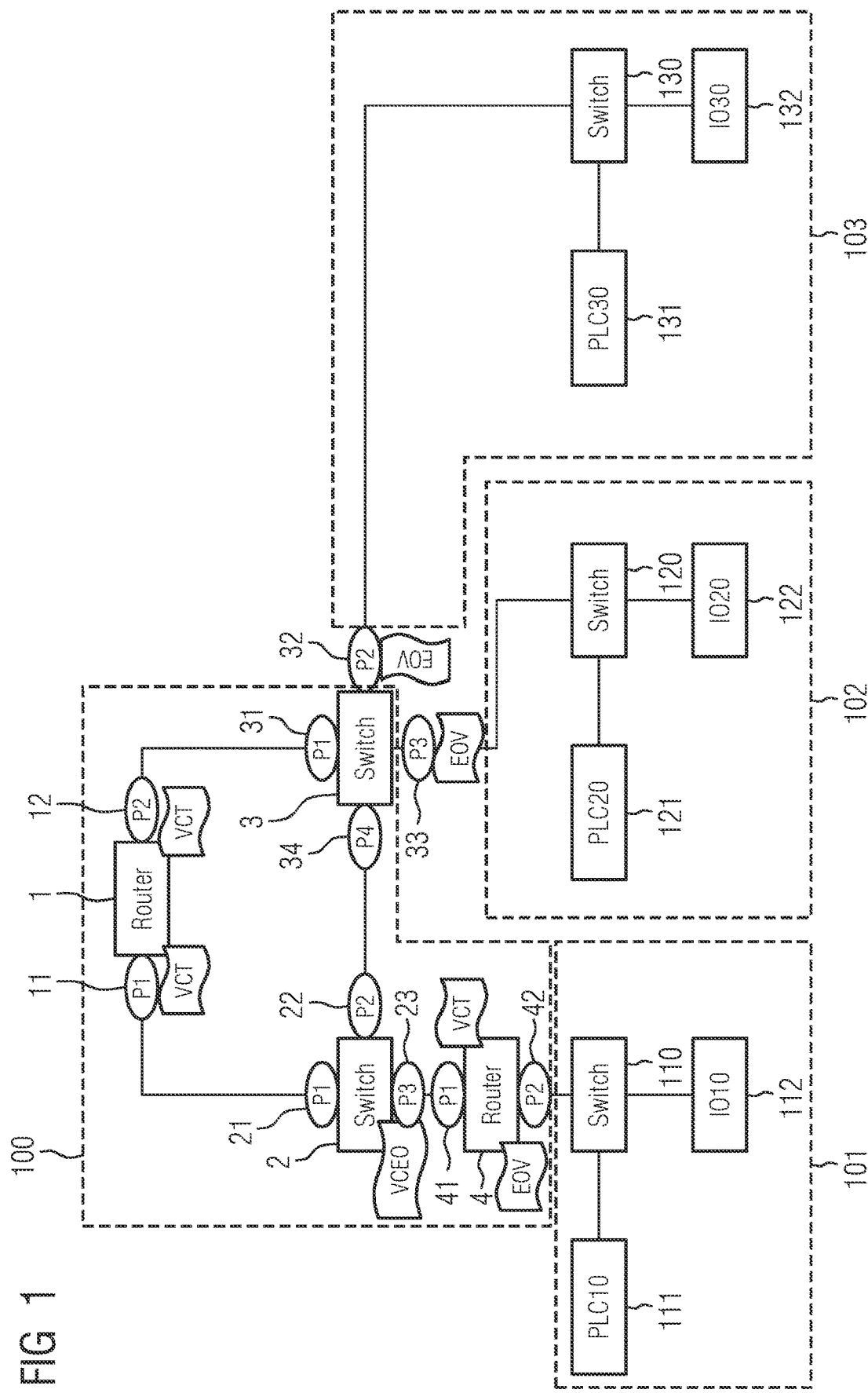
FIG. 1 shows a communication network of an industrial automation system having a plurality of VLANs defined via VLAN port configuration tags, and having a plurality of switches and routers in accordance with the invention.

The exemplary communication network of an industrial automation system illustrated in FIG. 1 comprises a plurality of automation cells 101-103 each with a switch 110, 120, 130, a programmable logic controller 111, 121, 131, and an input/output unit 112, 122, 132. The programmable logic controllers 111, 121, 131 and the input/output units 112, 122, 132 are connected to the respective switch 110, 120, 130.

The automation cells 101, 102, 103 are connected to each other by a higher-level network segment 100, which comprises a plurality of routers 1, 4 and switches 2-3. Via a first router 1, the higher-level network segment 100 and the automation cells 101, 102, 103 can be connected, for example, to a plant-wide control network, to an office communication network or to a wide-area network. A first switch 2 and a second switch 3 are also connected to the first router 1 and are also connected directly to each other. Here, a first port 11 of the first router 1 and a first port 21 of the first switch 2 are connected to each other, while a second port 12 of the first router 1 is connected to a first port 31 of the second switch 3. In addition, a second port 22 of the first switch 2 and a fourth port 34 of the second switch 3 are connected to each other.

Further, a third port 23 of the first switch 2 is connected to a first port 41 of a second router 4, via the second port 42 of which a first automation cell 101 is connected via its switch 110 to the higher-level network segment 100. A second automation cell 102 and a third automation cell 103 are connected to the higher-level network segment 100 via the second switch 3. Here, the second automation cell 102 is connected via its switch 120 to a third port 33 of the second switch 3, while the third automation cell 103 is connected via its switch 130 to a second port 32 of the second switch 3.

The programmable logic controllers 111, 121, 131 and the input/output units 112, 122, 132 each comprise integrated or assigned communication modules or devices and are used to control a machine or a technical system, such as a robot or a conveyor device. In particular, the programmable logic controllers 111, 121, 131 each comprise at least one central processing unit. The input/output units 112, 122, 132 are used to exchange control and measurement variables between the respective programmable logic controller 111, 121, 131 or input/output unit 112, 122, 132 and a controlled machine or device. The central processing units of the programmable logic controllers 111, 121, 131 determine suitable control variables for the respective machine or device based on measurement variables.

Using a configuration tool implemented by a control program, VLAN port configuration tags EOV (End of VLAN), VCT (VLAN Calculation Termination), VCEO (VLAN Calculation End Outbound) can be defined on a graphical user interface for the automated VLAN configuration of a communication network comprising multiple VLANs. The control program can be loaded into a working memory of a computer or a virtual machine and comprises at least one code section, during the execution of which the acts elaborated below are executed when the control program is running in the computer or in the virtual machine.

In the VLAN configuration, for each VLAN, starting from communication terminals on ports of switches and/or routers along paths assigned to the respective VLAN, a VLAN port operating mode is defined in each case depending on the usage of the respective port by the respective VLAN. Paths assigned to a VLAN comprise, in particular, selected paths that are used to transmit frames assigned to the respective VLAN.

The VLAN port operating modes each include at least a trunk mode (T) and an untagged mode (U). Data frames (or frames) that include a VLAN identifier assigned to the respective VLAN are routed via a port if the port is configured in trunk mode (T) for that VLAN. On the other hand, inbound frames (ingress) that do not include a VLAN identifier are routed via a port after inserting a VLAN identifier if the port is configured in untagged mode (U) for that VLAN in respect of inbound frames. By contrast, outbound frames (egress) that include a VLAN identifier assigned to the respective VLAN are routed via a port after removing the VLAN identifier if the port is configured in untagged mode (U) for that VLAN with respect to outbound frames.

In the present exemplary embodiment, the VLAN port operating modes additionally include a forbidden mode (F). Forwarding of inbound or outbound frames that include a VLAN identifier assigned to the respective VLAN via a port can be permanently blocked in a non-dynamically modifiable manner if the port is configured in forbidden mode (F) for that VLAN with respect to inbound or outbound frames. The VLAN port operating modes can be set for each port of a switch or router with respect to each VLAN such that they are differentiated by inbound and outbound data traffic (ingress/egress) in a VLAN configuration table for that switch or router.

First VLAN port configuration tags EOV are used to define VLAN segment boundaries. Inbound and outbound frames on the respective port are assigned to the same VLAN. In addition, second VLAN port configuration tags VCT are used to set limits for tracing the paths assigned to the respective VLAN to define the VLAN port operating modes. On the other hand, third VLAN port configuration tags are used to set limits for tracing the paths assigned to the respective VLAN only with respect to outbound frames to define the VLAN port operating modes. The tracing of the paths assigned to the respective VLAN, and a configuration of the ports comprised by these paths, which is based on the definition of the VLAN port operating modes, are controlled using these VLAN port configuration tags.

In the present exemplary embodiment, the tracing of the paths assigned to the respective VLAN to define the VLAN port operating modes is performed starting from each communication terminal assigned to the respective VLAN. For a VLAN with no assigned communication terminals, the tracing of the paths assigned to the respective VLAN to define the VLAN port operating modes is advantageously performed starting from at least one selected switch or router assigned to the respective VLAN. Here, in order to trace the paths assigned to the respective VLAN, for example, a switch or router can be selected at the lowest topological layer of the communication network within the respective VLAN segment boundary.

In order to define VLAN segment limits for the automation cells 101-103, each of which is to be assigned a separate VLAN, in the present exemplary embodiment a first VLAN port configuration tag EOV is set on the second port 42 of the second router 4, set on the second port 32 of the second switch 3 and set on the third port 33 of the second switch 3 (see FIG. 1). Accordingly, a VLAN 1 for the higher-level network segment 100, a VLAN 10 for the first automation cell 101, a VLAN 20 for the second automation cell 200 and a VLAN 30 for the third automation cell 103 are configured.

Tracing the paths for VLAN 10, VLAN 20, VLAN 30 should preferably end at the next topologically superordinate router in each case. Accordingly, in the present exemplary embodiment a second VLAN port configuration tag VCT is set on both ports 11-12 of the first router 1 and set on the first port 41 of the second router 2.

In addition, no tracing of the paths for VLAN 20, VLAN 30 should be performed into topologically subordinate network segments. For this reason, according to FIG. 1, a third VLAN port configuration tag VCEO is set on the third port 23 of the first switch 2.

With the VLAN port configuration tags set, the paths to be traced, highlighted by bold lines in FIGS. 2-5, are obtained for a configuration of VLAN 10, VLAN 20, VLAN 30, and VLAN 1. In the configuration of VLAN 10, the paths according to FIG. 2 comprise a transmission path 201 between the second router 4 and the switch 110 of the first automation cell 101, a transmission path 202 between the switch 110 and the programmable logic controller 111 of the first automation cell 101, and a transmission path 203 between the switch 110 and the input/output unit 112 of the first automation cell 101.

Figure 2:
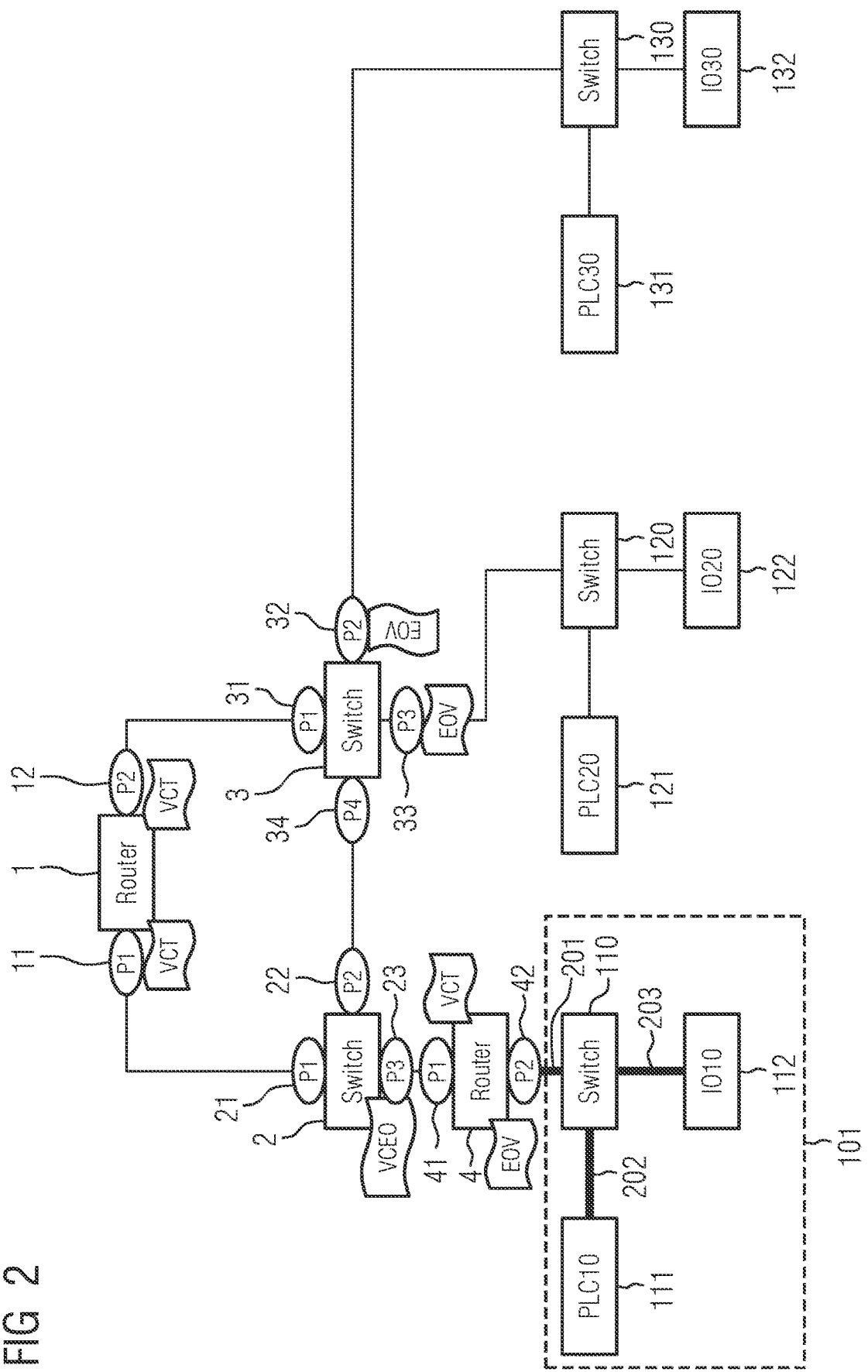
FIG. 2 shows a tracing of paths of the communication network assigned to a first VLAN for defining VLAN port operating modes on switches and routers included in the paths in accordance with the invention.

Because the paths assigned to the respective VLAN to define the VLAN port operating modes are traced as described above, starting from each communication terminal assigned to the respective VLAN, the paths highlighted in FIG. 2 for configuring VLAN 10 are traced both from the programmable logic controller 111 and from the input/output unit 112 of the first automation cell 101.

Initially, VLAN 1 is configured in untagged mode (U) for the higher-level network segment 100 on all ports of routers 1, 4 and switches 2-3 within the VLAN segment boundaries set by the first VLAN port configuration tags EOV for VLAN 1, specifically for both inbound frames (E) and outbound frames (A).

For the first router 1, the following VLAN configuration table will be obtained for its ports 11-12 (P1-P2) after initial configuration of VLAN 1 and completed configuration of VLAN 10 (E=inbound/ingress frames, A=outbound/egress frames):

TABLE 1

|  | P1 | | P2 | |
|---|---|---|---|---|
| Router 1 | E | A | E | A |
| VLAN 1 | U | U | U | U |

According to FIG. 2, no frames that are assigned to VLAN 10 are transmitted via the first router 1. Therefore, the VLAN configuration of Table 1 does not include an entry for VLAN 10. This also applies to the VLAN configuration tables for the first switch 2 and the second switch 3 shown below.

For the first switch 2, the following VLAN configuration Table 3 will be obtained for its ports 21, 22, 23 (P1, P2, P3) after initial configuration of VLAN 1 and completed configuration of VLAN 10:

TABLE 3

|  | P1 | | P2 | | P3 | |
|---|---|---|---|---|---|---|
| Switch 2 | E | A | E | A | E | A |
| VLAN 1 | U | U | U | U | U | U |

For the second switch 3, the following VLAN configuration Table 4 will be obtained for its ports 31, 33, 34 (P1, P2, P3, P4) after initial configuration of VLAN 1 and completed configuration of VLAN 10:

TABLE 4

|  | P1 | | P2 | | P3 | | P4 | |
|---|---|---|---|---|---|---|---|---|
| Switch 3 | E | A | E | A | E | A | E | A |
| VLAN 1 | U | U | U | U | U | U | U | U |

Without exception, a VLAN that comprises communication terminals without VLAN functionality and at the VLAN segment boundary of which the frames assigned to the VLAN are forwarded via a port on which a first VLAN port configuration tag EOV is set, is configured in untagged mode (U) for inbound and outbound frames on the respective port. Only one VLAN is ever configured in untagged mode for inbound frames (E) and outbound frames (A) on the port on which a first VLAN port configuration tag EOV is set. Accordingly, VLAN 10 on the second port 42 of the second router 4 is configured in untagged mode (U) for inbound frames (E) and for outbound frames (A).

For the second router 4, the following VLAN configuration Table 5 will be obtained for its ports 41-42 (P1-P2) after initial configuration of VLAN 1 and completed configuration of VLAN 10:

TABLE 5

|  | P1 | | P2 | |
|---|---|---|---|---|
| Router 4 | E | A | E | A |
| VLAN 1 | U | U | | |
| VLAN 10 | | | U | U |

Figure 3:
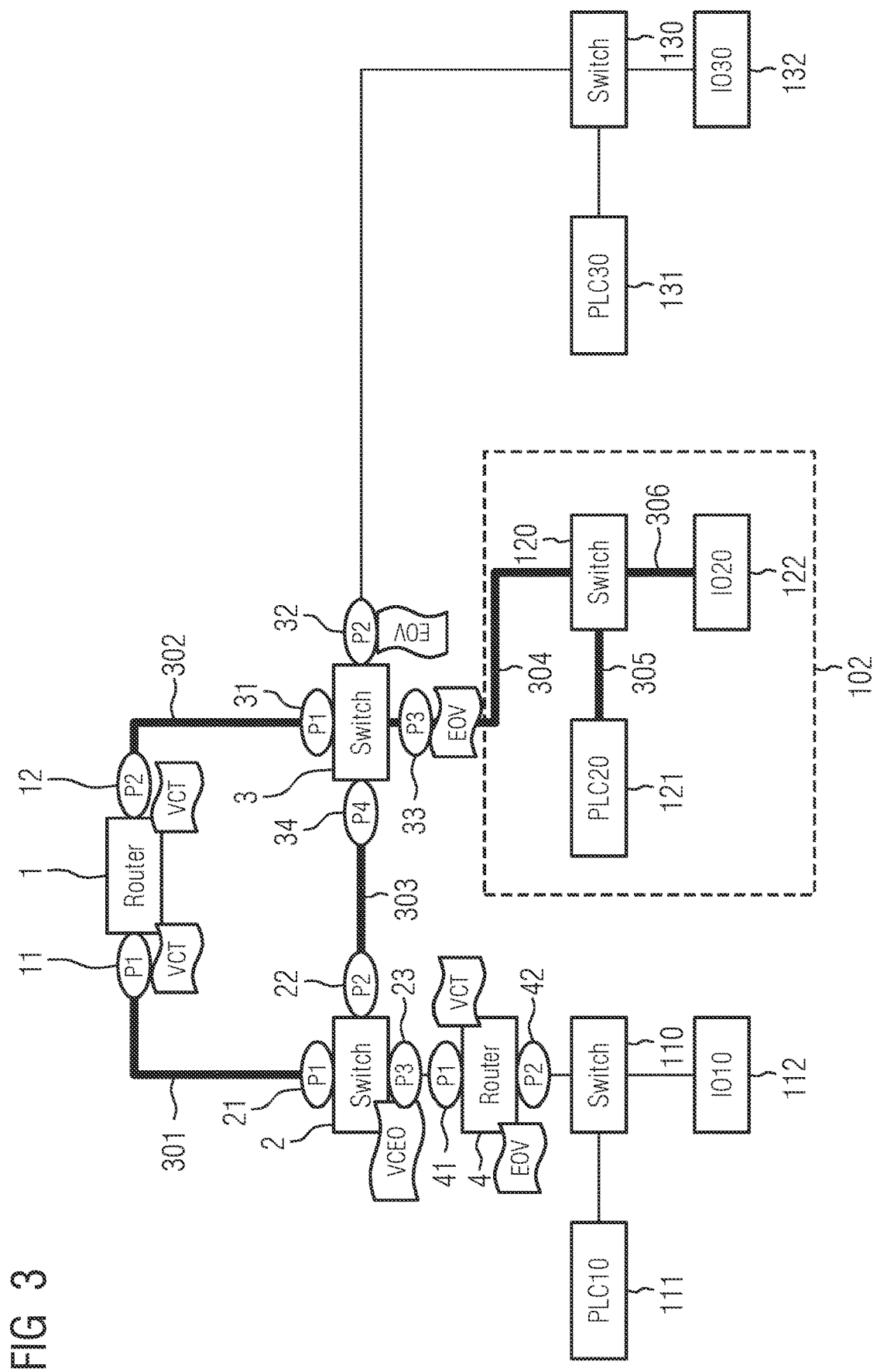
FIG. 3 shows a tracing of paths assigned to a second VLAN to determine the VLAN port operating modes on respective switches and routers in accordance with the invention.

In the configuration of VLAN 20, the paths to be traced according to FIG. 3 include two transmission paths 301, 302 from the first router 1 to the first switch 2 or second switch 3, a transmission path 303 between the first switch 2 and the second switch 3, a transmission path 304 between the second switch 3 and the switch 120 of the second automation cell 102, a transmission path 305 between the switch 120 and the programmable logic controller 121 of the second automation cell 102, and a transmission path 306 between the switch 120 and the input/output unit 122 of the second automation cell 102.

Because the paths assigned to the respective VLAN to define the VLAN port operating modes are traced as described above, starting from each communication terminal assigned to the respective VLAN, the paths highlighted in FIG. 3 for configuring VLAN 20 are traced both starting from the programmable logic controller 121 and from the input/output unit 122 of the second automation cell 102.

Without exception, each VLAN, the assigned frames of that are forwarded via a port on which a second VLAN port configuration tag VCT is set, is configured in trunk mode for outbound frames on the respective port. Accordingly, VLAN 20 is configured in trunk mode (T) on both ports 11-12 of the first router 1 for outbound frames (A). This also causes the configuration of VLAN 1 on these ports 11-12 for outbound frames (A) to be changed to trunk mode (T).

For the first router 1, the following VLAN configuration Table 6 will be obtained for its ports 11-12 (P1-P2) after initial configuration of VLAN 1 and completed configuration of VLAN 10 and VLAN 20:

TABLE 6

|  | P1 | | P2 | |
|---|---|---|---|---|
| Router 1 | E | A | E | A |
| VLAN 1 | U | T | U | T |
| VLAN 20 | | T | | T |

Because inbound frames (E) assigned to VLAN 20 are not filtered on any of ports 11-12, the above VLAN configuration Table 6 for the first router 1 does not contain any entries related to this. This also applies to subsequent VLAN configuration tables and unfiltered inbound frames (E).

Without exception, each VLAN that has no assigned inbound frames on a port, on which a third VLAN port configuration tag VCEO is set, is configured in forbidden mode (F) for outbound frames (A) on the respective port. By contrast, each VLAN that has assigned inbound frames (E) on a port, on which a third VLAN port configuration tag VCEO is set, is configured in trunk mode (T) for outbound frames (A) on the respective port. Accordingly, VLAN 20 is configured on the third port 23 of the first switch 2 in forbidden mode (F) for outbound frames (A), while VLAN 1 is configured on this port 23 in trunk mode (T) for outbound frames (A).

The ports 21-22 of the first switch 2 are included in the paths for VLAN 20 as shown in FIG. 3 and are therefore configured in trunk mode (T) for this VLAN in respect of outbound frames (A). This also causes the configuration of VLAN 1 on these ports 21-22 for outbound frames (A) to be changed to trunk mode (T).

For the first switch 2, the following modified VLAN configuration Table 7 will be obtained for its ports 21-23 (P1-P3) after initial configuration of VLAN 1 and completed configuration of VLAN 10 and VLAN 20:

TABLE 7

|  | P1 | | P2 | | P3 | |
|---|---|---|---|---|---|---|
| Switch 2 | E | A | E | A | E | A |
| VLAN 1 | U | T | U | T | U | T |
| VLAN 20 | | T | | T | | F |

Since a VLAN that comprises communication terminals without VLAN functionality and at the VLAN segment boundary of which the frames assigned to the VLAN are forwarded via a port on which a first VLAN port configuration tag EOV is set, is configured in untagged mode (U) on the respective port for inbound and outbound frames as described above, VLAN 20 is configured in untagged mode (U) on the third port 33 of the second switch 3 for inbound frames (E) and outbound frames (A).

The ports 31, 34 of the first switch 3 are included in the paths for VLAN 20 as shown in FIG. 3 and are therefore configured in trunk mode (T) for this VLAN in respect of outbound frames (A). This also causes the configuration of VLAN 1 on these ports 31, 34 for outbound frames (A) to be changed to trunk mode (T).

For the second switch 3, the following modified VLAN configuration Table 8 will be obtained for its ports 31-34 (P1-P4) after initial configuration of VLAN 1 and completed configuration of VLAN 10 and VLAN 20:

TABLE 8

|  | P1 | | P2 | | P3 | | P4 | |
|---|---|---|---|---|---|---|---|---|
| Switch 3 | E | A | E | A | E | A | E | A |
| VLAN 1 | U | T | U | U | | | U | T |
| VLAN 20 | | T | | | U | U | | T |

For the second router 4, the following unchanged VLAN configuration Table 9 will be obtained for its ports 41-42 (P1-P2) after initial configuration of VLAN 1 and completed configuration of VLAN 10 and VLAN 20:

TABLE 9

|          | P1 |   | P2 |   |
|----------|----|----|----|----|
|          | E  | A | E  | A |
| Router 4 |    |    |    |    |
| VLAN 1   | U  | U  |    |    |
| VLAN 10  |    |    | U  | U  |

Figure 4:
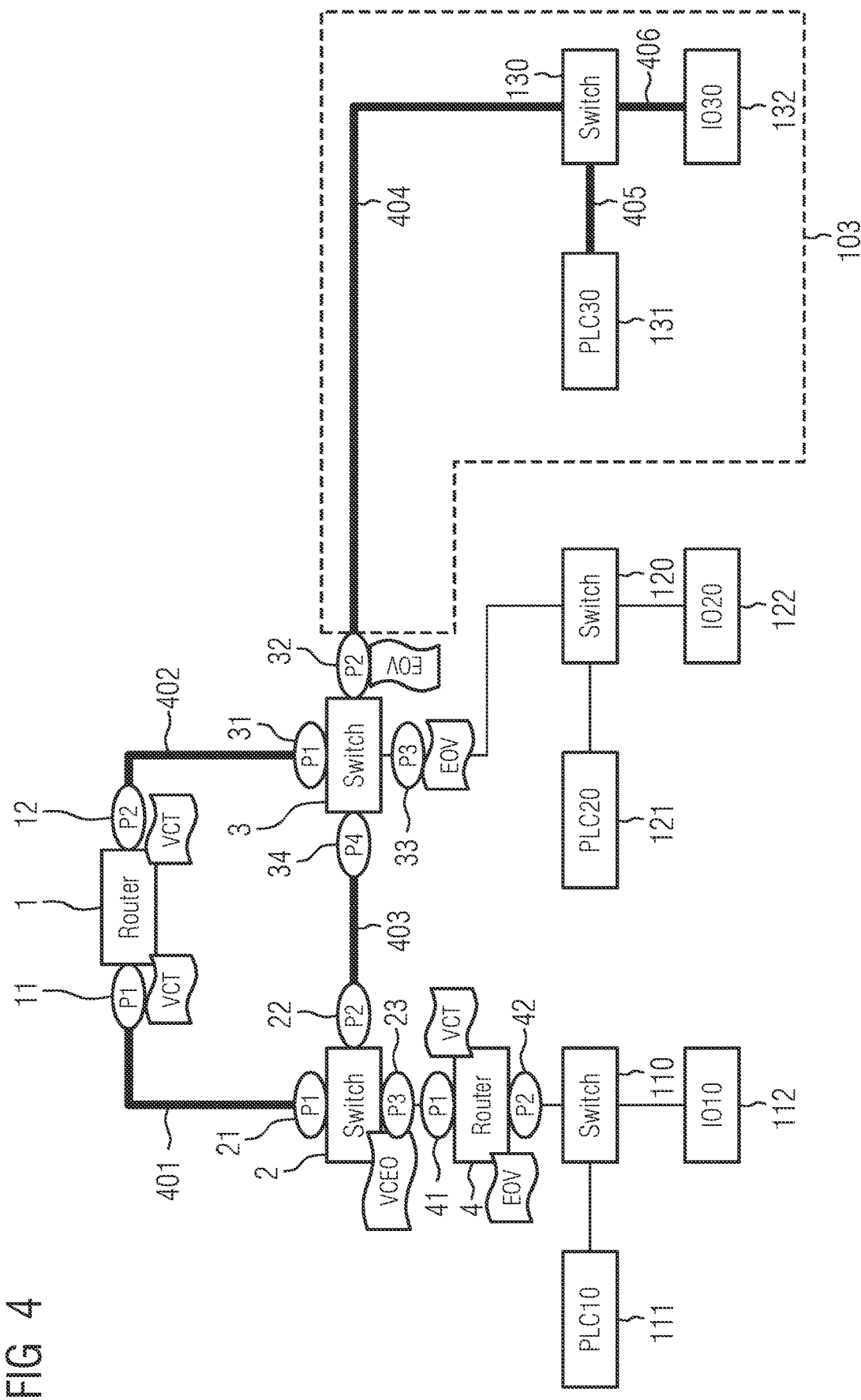
FIG. 4 shows a tracing of paths assigned to a third VLAN to determine the VLAN port operating modes on respective switches and routers in accordance with the invention.

In the configuration of VLAN 30, the paths to be traced according to FIG. 4 include two transmission paths 401, 402 from the first router 1 to the first switch 2 or second switch 3, a transmission path 403 between the first switch 2 and the second switch 3, a transmission path 404 between the second switch 3 and the switch 130 of the third automation cell 103, a transmission path 405 between the switch 130 and the programmable logic controller 131 of the third automation cell 103, and a transmission path 406 between the switch 130 and the input/output unit 132 of the third automation cell 103.

Because the paths assigned to the respective VLAN to define the VLAN port operating modes are traced as described above, starting from each communication terminal assigned to the respective VLAN, the paths highlighted in FIG. 4 for configuring VLAN 30 are traced both starting from the programmable logic controller 131 and from the input/output unit 132 of the third automation cell 103.

Since each VLAN, the assigned frames of which are forwarded via a port on which a second VLAN port configuration tag VCT is set, is configured in trunk mode on the respective port for outbound frames as described above, VLAN 30 is configured in trunk mode (T) on both ports 11-12 of the first router 1 for outbound frames (A).

For the first router 1, the following modified VLAN configuration Table 10 will be obtained for its ports 11-12 (P1-P2) after initial configuration of VLAN 1 and completed configuration of VLAN 10, VLAN 20 and VLAN 30:

TABLE 10

|          | P1 |   | P2 |   |
|----------|----|----|----|----|
|          | E  | A | E  | A |
| Router 1 |    |    |    |    |
| VLAN 1   | U  | T  | U  | T  |
| VLAN 20  |    | T  |    | T  |
| VLAN 30  |    | T  |    | T  |

Since each VLAN that has no assigned inbound frames on a port on which a third VLAN port configuration tag VCEO is set, is configured in forbidden mode (F) for outbound frames (A) on the respective port as described above, VLAN 30 is configured in forbidden mode (F) for outbound frames (A) on the third port 23 of the first switch 2.

The ports 21-22 of the first switch 2 are included in the paths for VLAN 30 as shown in FIG. 4. Accordingly, ports 21-22 of the first switch 2 for this VLAN are configured in trunk mode (T) in respect of outbound frames (A).

For the first switch 2, the following modified VLAN configuration Table 11 will be obtained for its ports 21-23 (P1-P3) after initial configuration of VLAN 1 and completed configuration of VLAN 10, VLAN 20 and VLAN 30:

TABLE 11

|          | P1 |   | P2 |   | P3 |   |
|----------|----|----|----|----|----|----|
|          | E  | A  | E  | A  | E  | A  |
| Switch 2 |    |    |    |    |    |    |
| VLAN 1   | U  | T  | U  | T  | U  | T  |
| VLAN 20  |    | T  |    | T  |    | F  |
| VLAN 30  |    | T  |    | T  |    | F  |

Since a VLAN that comprises communication terminals without VLAN functionality and at the VLAN segment boundary of which the frames assigned to the VLAN are forwarded via a port on which a first VLAN port configuration tag EOV is set, is configured in untagged mode (U) on the respective port for inbound and outbound frames as described above, VLAN 30 is configured in untagged mode (U) on the second port 32 of the second switch 3 for inbound frames (E) and for outbound frames (A).

The ports 31, 34 of the second switch 3 are included in the paths for VLAN 30 as shown in FIG. 4. Accordingly, ports 31, 32, 33, 34 of the second switch 3 for this VLAN are configured in trunk mode (T) in respect of outbound frames (A).

For the second switch 3, the following modified VLAN configuration Table 12 will be obtained for its ports 31-34 (P1-P4) after initial configuration of VLAN 1 and completed configuration of VLAN 10, VLAN 20 and VLAN 30:

TABLE 12

|          | P1 |   | P2 |   | P3 |   | P4 |   |
|----------|----|----|----|----|----|----|----|----|
|          | E  | A  | E  | A  | E  | A  | E  | A  |
| Switch 3 |    |    |    |    |    |    |    |    |
| VLAN 1   | U  | T  |    |    |    |    | U  | T  |
| VLAN 20  |    | T  |    |    | U  | U  |    | T  |
| VLAN 30  |    | T  | U  | U  |    |    |    | T  |

For the second router 4, the following unchanged VLAN configuration Table 13 will be obtained for its ports 41-42 (P1-P2) after initial configuration of VLAN 1 and completed configuration of VLAN 10, VLAN 20 and VLAN 30:

TABLE 13

|          | P1 |   | P2 |   |
|----------|----|----|----|----|
|          | E  | A  | E  | A  |
| Router 4 |    |    |    |    |
| VLAN 1   | U  | U  |    |    |
| VLAN 10  |    |    | U  | U  |

Figure 5:
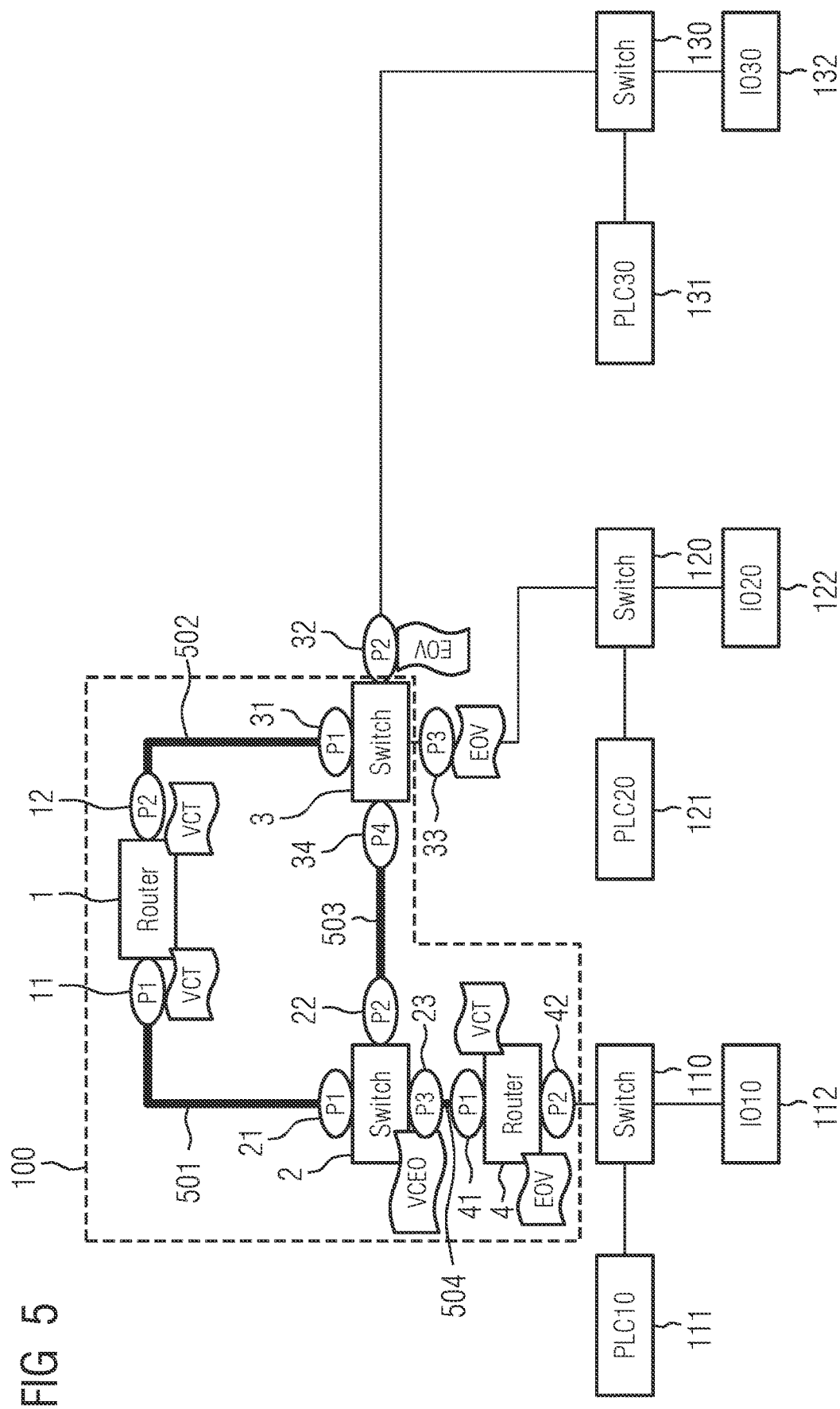
FIG. 5 shows a tracing of paths assigned to a higher-level VLAN to determine the VLAN port operating modes on respective switches and routers in accordance with the invention.

In the final configuration of VLAN 1, the paths to be traced according to FIG. 5 comprise two transmission paths 501, 502 from the first router 1 to the first switch 2 or second switch 3, a transmission path 503 between the first switch 2 and the second switch 3, and a transmission path 504 between the first switch 2 and the second router 4.

In accordance with the above statements, in the case of a VLAN without assigned communication terminals, the paths assigned to the respective VLAN to define the VLAN port operating modes are traced starting from at least one selected switch or router assigned to the respective VLAN, in particular from a switch or router on the lowest topological layer of the communications network within the respective VLAN segment boundary. In the present exemplary embodiment, for VLAN 1 this is the second router 4.

Tracing the paths highlighted in FIG. 5 to configure VLAN 1 no longer results in any major changes compared to previous statements. It is only important to note that the paths for configuring VLAN 1 are not traced starting from a communication terminal without VLAN functionality, but from the second router 4 with VLAN functionality. Accordingly, the configuration for VLAN 1 on the first port 41 of the second router 4 is changed to the trunk mode (T) in respect of outbound frames (A).

For the first router 1, the following unchanged VLAN configuration Table 14 will be obtained for its ports 11-12 (P1-P2) after completed configuration of VLAN 1, VLAN 10, VLAN 20 and VLAN 30:

TABLE 14

|  | P1 | | P2 | |
|---|---|---|---|---|
| Router 1 | E | A | E | A |
| VLAN 1 | U | T | U | T |
| VLAN 20 |  | T |  | T |
| VLAN 30 |  | T |  | T |

For the first switch 2, the following unchanged VLAN configuration Table 15 will be obtained for its ports 21-23 (P1-P3) after completed configuration of VLAN 1, VLAN 10, VLAN 20 and VLAN 30:

TABLE 15

|  | P1 | | P2 | | P3 | |
|---|---|---|---|---|---|---|
| Switch 2 | E | A | E | A | E | A |
| VLAN 1 | U | T | U | T | U | T |
| VLAN 20 |  | T |  | T |  | F |
| VLAN 30 |  | T |  | T |  | F |

For the second switch 3, the following unchanged VLAN configuration Table 16 will be obtained for its ports 31-34 (P1-P4) after completed configuration of VLAN 1, VLAN 10, VLAN 20 and VLAN 30:

TABLE 16

|  | P1 | | P2 | | P3 | | P4 | |
|---|---|---|---|---|---|---|---|---|
| Switch 3 | E | A | E | A | E | A | E | A |
| VLAN 1 | U | T |  |  |  |  | U | T |
| VLAN 20 |  | T |  |  | U | U |  | T |
| VLAN 30 |  | T | U | U |  |  |  | T |

Port 41 of the second router 4 is included in the paths for VLAN 1 according to FIG. 5, and the second router 4 does not represent a communication device without VLAN functionality. Therefore, port 41 of the second router 4 is configured in trunk mode (T) for VLAN 1 in respect of outbound frames (A).

For the second router 4, the following modified VLAN configuration Table 17 will be obtained for its ports 41-42 (P1-P2) after completed configuration of VLAN 1, VLAN 10, VLAN 20 and VLAN 30:

TABLE 17

|  | P1 | | P2 | |
|---|---|---|---|---|
| Router 4 | E | A | E | A |
| VLAN 1 | U | T |  |  |
| VLAN 10 |  |  | U | U |

Figure 6:
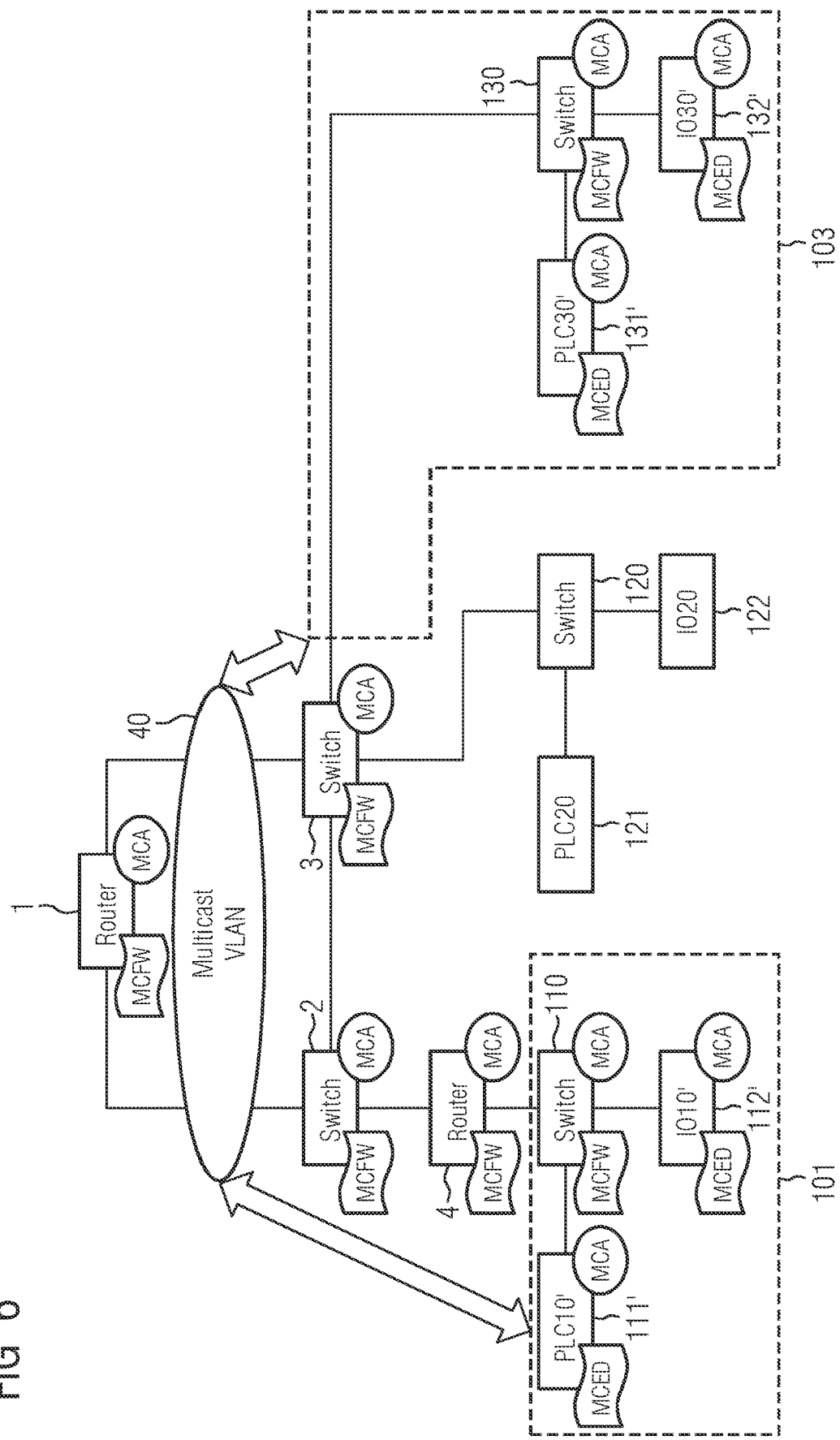
FIG. 6 shows the communication network of FIG. 1 with an additional multicast VLAN, defined via VLAN multicast configuration tags, which couples two different VLANs for forwarding multicast frames between communication terminals of these two VLANs.

In addition to the VLAN port configuration tags EOV, VCT, VCEO, in accordance with FIG. 6 VLAN multicast configuration tags can be set to control an automated configuration of a separate multicast VLAN for transmitting multicast frames within a multicast domain comprising multiple VLANs. For forwarding multicast frames between communication terminals in two different VLANs, a multicast VLAN coupling the two VLANs to each other is configured, which comprises forwarding communication devices in both VLANs, communication terminals in both VLANs, and comprises forwarding communication devices along at least one path between the two VLANs. Without exception, the multicast VLAN coupling the two VLANs is configured in trunk mode (T) for outbound multicast frames on the respective port of the communication devices forwarding the multicast frames.

In the present exemplary embodiment, the intention is to enable an exchange of multicast data traffic between communication terminals 111', 112' in the first automation cell 101, on the one hand, and communication terminals 131', 132' in the third automation cell 103, on the other hand. At least on the transmitter side, the communication terminals 111', 112', 131', 132' have VLAN functionality for this purpose. An exchange of multicast data traffic between communication terminals that are initially assigned to different VLANs may be desired, for example, if GOOSE (IEC 61850-8-1) or Open Platform Communications United Architecture (OPC UA) Publishers and Subscribers are to communicate with each other across automation cells.

With first VLAN multicast configuration tags MCA, VLAN segment boundaries are advantageously defined for transmission of multicast frames within a multicast domain comprising multiple VLANs. In addition, second VLAN multicast configuration tags MCFD are used to specify communication devices 1, 2, 3, 4, 110, 130 forwarding multicast frames within the multicast domain. In the present exemplary embodiment, these are the first router 1, the first switch 2, the second switch 3, the switch 110 of the first automation cell and the switch 130 of the third automation cell 103.

In addition, third VLAN multicast configuration tags MCED are used to specify communication terminals 111', 112', 131', 132' sending or receiving multicast frames within the respective multicast domain. In the present exemplary embodiment, these are the programmable logic controller 111' and the input/output unit 112' of the first automation cell 101 and the programmable logic controller 131' and the input/output unit 132' of the third automation cell 103. Using the VLAN multicast configuration tags, the VLAN port operating mode of the ports of the communication devices forwarding multicast frames that are assigned to the respective multicast domain is defined for each multicast domain.

For the multicast domain defined according to the first VLAN multicast configuration tags MCA, a separate multicast VLAN 40 is configured. Ports between communication devices 1, 2, 3, 4, 110, 130 forwarding multicast frames, which are assigned to the same multicast domain and defined according to the same VLAN multicast configuration brands MCFD, are always configured in trunk mode (T) for the multicast VLAN 40. In addition, ports on communication devices 110, 130 forwarding multicast frames, to which communication terminals 111', 112', 131', 132' assigned to the same multicast domain and defined in accordance with the third VLAN multicast configuration tags MCED are connected, are configured in trunk mode (T) for the multicast VLAN 40. Preferably, ports on communication devices forwarding multicast frames, to which no communication terminals are connected that are defined by third VLAN multicast configuration tags MCED and/or assigned to a multicast domain, are also configured in forbidden mode (F) for the respective multicast VLAN. In the present exemplary embodiment, however, no such ports exist.

Figure 7:
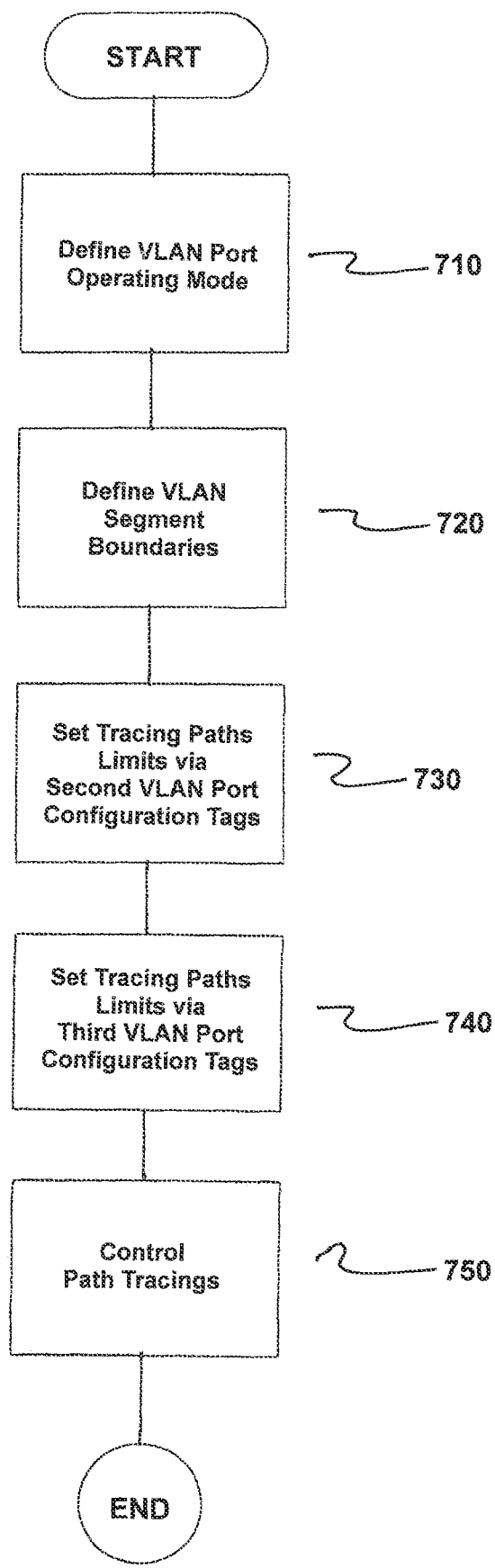
FIG. 7 is a flowchart of the method in accordance with the invention.

FIG. 7 is a flowchart of the method for automated configuration of a communications network comprising a plurality of Virtual Local Area Networks (VLANs).

The method comprises defining a VLAN port operating mode, for each VLAN, depending on usage of a respective port by a respective VLAN, starting from communication terminals 111-112, 121-122, 131-132 on ports of at least one of switches 2-3, 110, 120, 130 and routers 1, 4 along paths 201-203, 301-306, 401-406, 501-504 assigned to the respective VLAN, as indicated in step 710.

Next, first VLAN port configuration tags EOV are used to define VLAN segment boundaries, as indicated in step 720. Here, inbound and outbound frames on the respective port are assigned to the same VLAN.

Next, second VLAN port configuration tags VCT are used to set limits for tracing paths assigned to the respective VLAN to define the VLAN port operating modes, as indicated in step 730.

Next, third VLAN port configuration tags VCEO are used to set limits for tracing the paths assigned to the respective VLAN only with respect to outbound frames to define the VLAN port operating modes, as indicate in step 740.

Next, the VLAN port configuration tags are used to control the tracing of the paths assigned to the respective VLAN and a configuration of the ports included in these paths, which is based on the definition of the VLAN port operating modes, as indicated in step 750.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for automated configuration of a communications network comprising a plurality of Virtual Local Area Networks (VLANs), the method comprising:
defining a VLAN port operating mode, for each VLAN, depending on usage of a respective port by a respective VLAN, starting from communication terminals on ports of at least one of switches and routers along paths assigned to the respective VLAN;
defining VLAN segment boundaries utilizing first VLAN port configuration tags, inbound and outbound frames on the respective port being assigned to the same VLAN;
utilizing second VLAN port configuration tags to set limits for tracing paths assigned to the respective VLAN to define the VLAN port operating modes;
utilizing third VLAN port configuration tags to set limits for tracing the paths assigned to the respective VLAN only with respect to outbound frames to define the VLAN port operating modes;
controlling the tracing of the paths assigned to the respective VLAN and a configuration of the ports included in these paths, which is based on the definition of the VLAN port operating modes, utilizing the VLAN port configuration tags;
wherein the VLAN port operating modes each comprise at least a trunk mode and an untagged mode;
wherein frames comprising a VLAN identifier assigned to the respective VLAN are forwarded via a port if the port is configured for the respective VLAN in the trunk mode;
wherein inbound frames which do not include a VLAN identifier are forwarded via a port after inserting a VLAN identifier if the port is configured for the respective VLAN in untagged mode with respect to inbound frames;
wherein outbound frames which comprise a VLAN identifier assigned to the VLAN are forwarded via the port after removing the VLAN identifier if the port is configured for a particular VLAN in untagged mode with respect to outbound frames;
wherein first VLAN multicast configuration tags are utilized to define VLAN segment boundaries for transmission of multicast frames within a multicast domain comprising multiple VLANs;
wherein second VLAN multicast configuration tags are utilized to define communication devices forwarding multicast frames within the multicast domain;
wherein third VLAN multicast configuration tags are utilized to define communication terminals at least one of sending and receiving multicast frames within the respective multicast domain; and
wherein the VLAN multicast configuration tags are each utilized to define the VLAN port operating mode of the ports of the multicast frames that are assigned to the respective multicast domain for each multicast domain.

2. The method as claimed in claim 1, wherein a VLAN, which comprises communication terminals without VLAN functionality and at a VLAN segment boundary of which frames assigned to the VLAN are forwarded via a port at which a first VLAN port configuration tag is set, is configured in untagged mode for inbound and outbound frames on the respective port.

3. The method as claimed in claim 2, wherein only one VLAN is configured in untagged mode for inbound and outbound frames on the port on which a first VLAN port configuration tag is set.

4. The method as claimed claim 1, wherein each VLAN, having assigned frames which are forwarded via a port on which a second VLAN port configuration tag is set, is configured in trunk mode for outbound frames on the respective port.

5. The method as claimed in claim 1, wherein the VLAN port operating modes each additionally comprise a forbidden mode;
wherein forwarding of inbound or outbound frames comprising a VLAN identifier assigned to the respective VLAN is permanently blocked in a non-dynamically modifiable manner via a port if this port is configured in forbidden mode for the respective VLAN with respect to inbound or outbound frames; and wherein each VLAN, which has no assigned inbound frames on a port on which a third VLAN port configuration tag (VCEO) is set, is configured in forbidden mode for outbound frames on the respective port.

6. The method as claimed in claim 1, wherein each VLAN which has assigned inbound frames on a port, on which a third VLAN port configuration tag is set, is configured in trunk mode for outbound frames on the respective port.

7. The method as claimed in claim 1, wherein at least one separate multicast VLAN is configured for the multicast domain defined in accordance with the first VLAN multicast configuration tags;

wherein ports between communication devices forwarding multicast frames assigned to the same multicast domain and defined in accordance with the second VLAN multicast configuration tags are configured in trunk mode for the respective multicast VLAN; and wherein ports on communication devices forwarding multicast frames, to which communication terminals to the same multicast domain and defined in accordance with the third VLAN multicast configuration tags are connected, are configured in trunk mode for the respective multicast VLAN.

8. The method as claimed in claim 7, wherein the VLAN port operating modes each comprise a forbidden mode; and wherein ports on communication devices forwarding multicast frames, to which no communication terminals are connected which are at least one of defined by third VLAN multicast configuration tags and assigned to a multicast domain, are configured in forbidden mode for the respective multicast VLAN.

9. The method as claimed in claim 1, wherein, for forwarding multicast frames between communication terminals in two different VLANs, a multicast VLAN coupling the two VLANs is configured, which comprises forwarding communication devices in both VLANs, communication terminals in both VLANs, and forwarding communication devices along at least one path between the two VLANs; and wherein a multicast VLAN coupling the two VLANs is configured in trunk mode for outbound multicast frames on the respective port of the communication devices forwarding the multicast frames.

10. The method as claimed in claim 7, wherein, for forwarding multicast frames between communication terminals in two different VLANs, a multicast VLAN coupling the two VLANs is configured, which comprises forwarding communication devices in both VLANs, communication terminals in both VLANs, and forwarding communication devices along at least one path between the two VLANs; and wherein a multicast VLAN coupling the two VLANs is configured in trunk mode for outbound multicast frames on the respective port of the communication devices forwarding the multicast frames.

11. The method as claimed in claim 8, wherein, for forwarding multicast frames between communication terminals in two different VLANs, a multicast VLAN coupling the two VLANs is configured, which comprises forwarding communication devices in both VLANs, communication terminals in both VLANs, and forwarding communication devices along at least one path between the two VLANs; and wherein a multicast VLAN coupling the two VLANs is configured in trunk mode for outbound multicast frames on the respective port of the communication devices forwarding the multicast frames.

12. The method as claimed in claim 1, wherein paths assigned to a VLAN comprise selected paths that are utilized to transmit frames assigned to the respective VLAN.

13. The method as claimed in claim 1, wherein the tracing of the paths assigned to the respective VLAN to define the VLAN port operating modes is performed starting from each communication terminal assigned to the respective VLAN.

14. The method as claimed in claim 1, wherein the tracing of the paths assigned to the respective VLAN to define the VLAN port operating modes for a VLAN with no assigned communication terminals is performed starting from at least one selected switch or router assigned to the respective VLAN.

15. The method as claimed in claim 14, wherein a switch or router is selected at a lowest topological layer of the communication network within the respective VLAN segment boundary to trace the paths assigned to the respective VLAN.

16. A control program for performing the method as claimed in claim 1, wherein the control program is stored in a working memory of a computer or a virtual machine and includes at least one code section, during the execution of the control program when the control program is running in the computer or in the virtual machine:

for each VLAN, starting from communication terminals on ports of at least one of switches and routers along paths assigned to the respective VLAN, a VLAN port operating mode is defined depending on usage of a respective port by a respective VLAN;

first VLAN port configuration tags are utilized to define VLAN segment boundaries, inbound and outbound frames on the respective port being assigned to the same VLAN;

second VLAN port configuration tags are utilized to set limits for tracing the paths assigned to the respective VLAN to define the VLAN port operating modes;

third VLAN port configuration tags are utilized to set limits for tracing the paths assigned to the respective VLAN only with respect to outbound frames to define the VLAN port operating modes;

the tracing of the paths assigned to the respective VLAN and a configuration of the ports included in these paths, which is based on the definition of the VLAN port operating modes, are controlled using the VLAN port configuration tags.

* * * * *